UNITED STATES PATENT OFFICE 2,452,263

DISAZO DYESTUFFS

Rudolf Ruegg, Basel, Switzerland, assignor to Ciba Limited, Basel, Switzerland, a Swiss firm No Drawing. Application January 20, 1947, Serial No. 723,205. In Switzerland January 31, 1946

4 Claims. (Cl. 260—190)

According to this invention new disazo-dyestuffs suitable for dyeing animal fibers are made by coupling a diazo-compound of a monoazo-dyestuff of the general formula

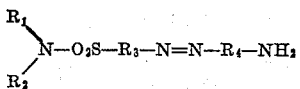

in which $R_1$ represents hydrogen or an alkyl or cycloalkyl radical, $R_2$ represents hydrogen or an alkyl, aryl, aralkyl or cycloalkyl radical, $R_3$, represents a benzene radical, and $R_4$ represents a naphthalene radical in which the —N=N— and —NH$_2$ groups are in para-position relatively to each other, with a 1-N-alkylamino- or 1-N-arylamino - naphthalene - 8-sulfonic acid, and so choosing the components that the final dyestuff contains two sulfonic acid groups.

Especially valuable results are obtained by using as a starting material a diazo-compound of a monoazo-dyestuff of the general formula

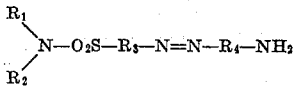

in which $R_1$ represents an alkyl radical containing at most four carbon atoms, $R_2$ represents the residue of a benzene sulfonic acid, $R_3$ represents a benzene radical in which the groups

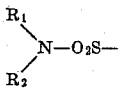

and —N=N— are in meta-position or para-position relatively to each other, and $R_4$ represents a naphthalene radical in which the —N=N— and —NH$_2$ groups are in para-position relatively to each other, and coupling such a diazo-compound with a 1-N-aryl-aminonaphthalene- 8 -sulfonic acid, and so choosing the components that the final dyestuff contains two sulfonic acid groups.

Accordingly, there are especially valuable as starting materials diazo-compounds of monoazo-dyestuffs of the general formula

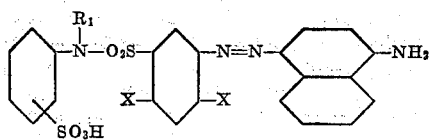

in which $R_1$ represents a methyl or ethyl group, and one X represents hydrogen and the other X hydrogen, halogen or a methyl group, and as coupling components there are primarily suitable 1-N-phenylamino- or 1-N-para-tolylaminonaphthalene-8-sulfonic acid.

The monoazo-compounds used as starting materials are obtained in known manner, for example, by coupling a diazotised aminoaryl sulfonamide of the general formula

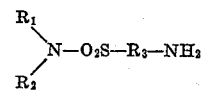

in which $R_1$, $R_2$ and $R_3$ have the meanings given above, with an amine of the naphthalene series capable of coupling in the 4-position relatively to the NH$_2$ group.

Aminoaryl sulfonamides of the above general formula can be made by methods in themselves known, for example, by reacting preferably 1-nitrobenzene-3-sulfochloride, or alternatively 1-methyl-2-nitrobenzene- 4 -sulfochloride, 1-methoxy-2-nitrobenzene-4-sulfo-chloride, 1-methyl-4-nitrobenzene-6-sulfochloride, 1-chloro - 2 - nitrobenzene-4-sulfochloride, 1 - chloro-4 - nitrobenzene-6-sulfochloride, or 1-nitrobenzene-2- or -4-sulfochloride with ammonia or a primary or secondary amine, if desired, sulfonating the resulting nitroaryl sulfonamide and reducing the nitro group to an amino group. As primary or secondary amines suitable for reaction with nitrobenzene sulfochlorides there may be mentioned, for example: Methylamine, monoethanolamine, dimethylamine, dipropylamine, butylamine, diethanolamine, cyclohexylamine, aminobenzene, 1-amino-4-methylbenzene, 1-amino-2-methoxybenzene, N-methylaminebenzene, N-ethylaminobenzene, 1-N-hydroxyethylaminobenzene, 1-N-ethylaminobenzene-3-sulfonic acid and the like.

As amines of the naphthalene series capable of coupling in the para-position with respect to the NH$_2$ group there come into consideration principally 1-aminonaphthalene, 1-aminonaphthalene-6- or -7-sulfonic acid or commercial mixtures of these two acids. Among the 1-alkylamino- or 1-arylamino-naphthalene-8-sulfonic acids there may be mentioned principally: 1 - Ethylaminonaphthalene - 8 - sulfonic acid, 1-phenylaminonaphthalene-8-sulfonic acid and 1-(4'-tolylamino)-naphthalene-8-sulfonic acid.

The disazo-dyestuffs obtainable by the invention are new and correspond to the general formula

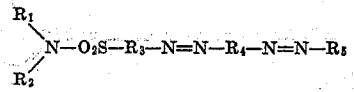

in which $R_1$ represents hydrogen or an alkyl or cycloalkyl radical, $R_2$ represents hydrogen or an alkyl, aryl, aralkyl or cycloalkyl radical, $R_3$ represents a benzene radical, $R_4$ represents a naphalene radical in which the two azo-groups are in para-position relatively to each other, and $R_5$ represents the residue of a 1-N-alkyl-amino- or 1-N-arylamino-naphthalene-8-sulfonic acid connected in the 4-position to the azo-group.

The new dyestuffs obtainable by the invention dye animal fibers fast violet-blue to navy blue tints. As compared with known dyestuffs of similar constitution the new dyestuffs are distinguished by yielding dyeings of better fastness to washing.

The following examples illustrate the invention, the parts are by weight:

Example 1

6.8 parts of 3-aminobenzene sulfonic acid-(1)-[N-methylanilide-X-sulfonic acid] are dissolved in 50 parts of water with the calculated quantity of sodium hydroxide, and mixed with 1.4 parts of sodium nitrite. After the addition of 30 parts of ice 10 parts of concentrated hydrochloric acid are introduced. The resulting white suspension of the diazo-compound is coupled in the usual manner with 3 parts of 1-amino-naphthalene, and then the red-violet dyestuff is separated by filtering with suction and washed with dilute hydrochloric acid. It is then suspended in 100 parts of water and dissolved by the addition of sodium hydroxide. The weakly alkaline solution is mixed with 2 parts of sodium nitrite, and diazotized by introducing 10 parts of concentrated hydrochloric acid. The brown diazo-compound is isolated, washed with dilute hydrochloric acid, and suspended in 50 parts of water, 6 parts of 1-phenyl-aminonaphthalene-8-sulfonic acid are dissolved in 40 parts of water with the calculated quantity of sodium hydroxide. The weakly alkaline solution is rendered weakly acid by the addition of a small quantity of acetic acid, mixed with 4 parts of crystalline sodium acetate, and then mixed with the above diazo-suspension while cooling. After a few hours the coupling is complete. From the deep blue solution obtained after neutralization with sodium carbonate the dyestuff is precipitated at 70° C. by the addition of sodium chloride. The dyestuff of the formula

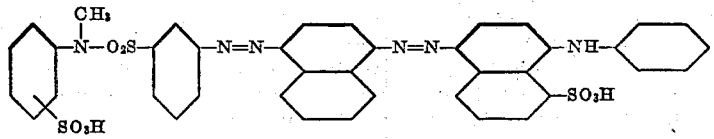

is separated by filtering with suction and washed with a dilute solution of sodium chloride. When dry it is a dark blue powder which dissolves in hot water with a reddish blue coloration and dyes wool navy blue.

By using 1-(4'-tolylamino)-naphthalene-8-sulfonic acid, instead of 1-phenylaminonaphthalene-8-sulfonic acid, a blue dyestuff is obtained having similar properties. A similar procedure may be followed with any of the other starting materials mentioned in the opening part of this specification.

Example 2

35.6 parts of 3-aminobenzene sulfonic acid-(1)-(N-ethylanilide-3'-sulfonic acid) are suspended in 200 parts of water and dissolves under weakly alkaline conditions with 4 parts of sodium hydroxide. The solution is mixed with 7 parts of sodium nitrite, and then 30 parts of concentrated hydrochloric acid are introduced at a temperature below 5° C. A suspension of the sparingly soluble diazo-compound is obtained, which is then coupled in the usual manner with 14.3 parts of 1-amino-naphthalene. The blue-red aminoazo-dyestuff is suspended in 500 parts of water, dissolved under weakly alkaline conditions with sodium hydroxide, and mixed with a concentrated solution of 8 parts of sodium nitrite and with 60 parts of concentrated hydrochloric acid. When the diazotization is finished, the red-brown diazo-compound is isolated, and introduced into a solution of 32 parts of sodium 1-phenylaminonaphthalene-8-sulfonate, 20 parts of crystalline sodium acetate and 3 parts of acetic acid in 500 parts of water. After a few hours the dyestuff formation ceases. The dyestuff of the formula

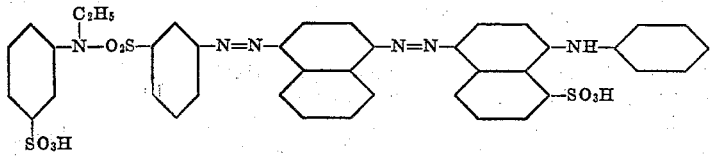

after conversion into its disodium salt by means of sodium carbonate, is precipitated at 65° C. with a saturated solution of sodium chloride, isolated while hot, and washed with a dilute solution of sodium chloride. When dry it is a dark powder, which dissolves in water with a deep blue coloration and dyes wool navy blue from an acetic acid bath.

By using the sodium salt of 1-(4'-tolylamino)-naphthalene-8-sulfonic acid, instead of the sodium salt of 1-phenylaminonaphthalene-8-sulfonic acid, there is obtained a similar dyestuff which dyes wool.

Example 3

34.2 parts of 4-aminobenzene sulfonic acid-(1)-(N-methylanilide-X-sulfonic acid) are suspended in 250 parts of water and dissolved with 4 parts of sodium hydroxide. After the addition of 7 parts of sodium nitrite, 30 parts of concentrated hydrochloric acid are introduced at a temperature below 10° C. The yellowish diazo-suspension is coupled in the usual manner with 14.3 parts of 1-aminonaphthalene. The blue-red amino-azo-dyestuff is suspended in 500 parts of water, then rendered weakly alkaline with sodium hydroxide, and mixed with a concentrated solution of 8 parts of sodium nitrite and with 50 parts of concentrated hydrochloric acid. The brown, sparingly soluble diazo-compound is separated by filtering with suction, washed with dilute hydrochloric acid, suspended in 100 parts of water, and then introduced into a solution of 46 parts of sodium 1-(4'-tolylamino)-naphthalene-8-sulfonate, 20 parts of crystalline sodium acetate and 3 parts of acetic acid in 400 parts of water. When the formation of dyestuff has ceased, the blue dyestuff suspension is mixed at 70° C. with sodium carbonate until it has a weakly alkaline reaction, and then the dyestuff of the formula

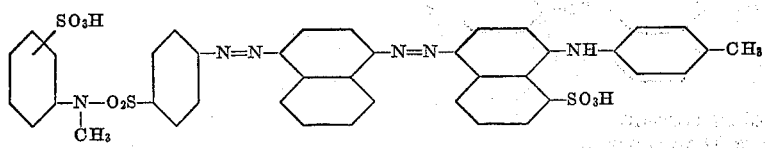

is precipitated with a saturated solution of sodium chloride. The dyestuff is isolated, and washed with a dilute solution of sodium chloride and dried. A dark blue powder is obtained which has a superficial greenish lustre, dissolves in water with a blue coloration and dyes wool blue from an acetic acid bath.

*Example 4*

37.7 parts of 3-amino-6-chlorobenzene sulfonic acid-(1)-(N-methylanilide-X-sulfonic acid) are suspended in 250 parts of water and dissolved with 4 parts of sodium hydroxide. The whole is mixed with 7 parts of sodium nitrite, and then with 30 parts of concentrated hydrochloric acid at a temperature below 5° C. The diazo-compound, which at first precipitates in an oily form, soon crystallises, and is then coupled in the usual manner with 14.3 parts of 1-aminonaphthalene. The blue-red amino-azodyestuff is isolated, suspended in 800 parts of water, converted into its sodium salt with sodium hydroxide, mixed with a concentrated solution of 8 parts of sodium nitrite, and then mixed with 60 parts of concentrated hydrochloric acid. The brown diazo-compound is isolated after a few hours, washed with dilute hydrochloric acid, suspended in 100 parts of water, and introduced into a solution of 32 parts of sodium 1-phenyl-aminonaphthalene-8-sulfonate, 30 parts of crystalline sodium acetate and 5 parts of acetic acid in 400 parts of water. After a few hours the dyestuff suspension is mixed with sodium carbonate until it has a weakly alkaline reaction. At 75° C. the dyestuff is precipitated with a saturated solution of sodium chloride, filtered hot, and washed with a dilute solution of sodium chloride. The dry dyestuff of the formula

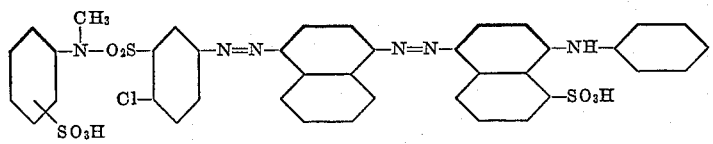

is a blue powder having a superficial reddish lustre, which dissolves in water with a blue coloration and dyes wool blue from an acetic acid bath.

A similar dyestuff is obtained by using the sodium salt of 1-(4'-tolylamino)-naphthalene-8-sulfonic acid, instead of the sodium salt of 1-phenyl-aminonaphthalene-8-sulfonic acid, or 3-amino-4-chlorobenzene sulfonic acid-(1)-(N-methylanilide-X-sulfonic acid), instead of 3-amino-6-chlorobenzene sulfonic acid-(1)-(N-methylanilide-X-sulfonic acid).

*Example 5*

35.6 parts of 3-amino-4-methylbenzene sulfonic acid-(1)-(N-methylanilide-X-sulfonic acid) are suspended in 200 parts of water and dissolved with 4 parts of sodium hydroxide. The solution is mixed with 7 parts of sodium nitrite, and then 30 parts of concentrated hydrochloric acid are introduced at a temperature below 5° C. The sparingly soluble diazo-compound soon precipitates, and is coupled in the usual manner with 14.3 parts of 1-aminonaphthalene. The amino-azo-dyestuff is suspended in 900 parts of water, dissolved to a weakly alkaline reaction with sodium hydroxide, and mixed with a concentrated solution of 8 parts of sodium nitrite and with 60 parts of concentrated hydrochloric acid. The brown diazo-compound is isolated after a few hours, washed with dilute hydrochloric acid and suspended in 200 parts of water. The resulting magma is mixed with a solution of 32 parts of sodium 1-phenylaminonaphthalene-8-sulfonate, 20 parts of crystallined sodium acetate and 4 parts of acetic acid in 400 parts of water. After a few hours the coupling is finished. The whole is mixed at 70° C. with sodium carbonate until it has a weakly alkaline reaction, and then the dyestuff of the formula

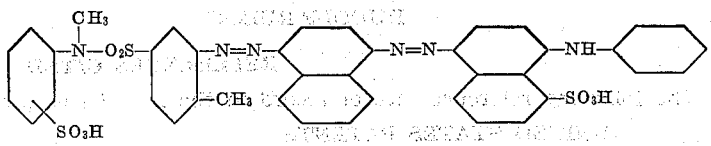

is precipitated with a saturated solution of sodium chloride. When dry it is a blue powder having a superficial greenish lustre, which dissolves in water with a blue coloration and dyes wool blue from an acetic acid bath.

A similar dyestuff is obtained by using the sodium salt of 1-(4'-tolylamino)-naphthalene-8-sulfonic acid, instead of the sodium salt of 1-phenylaminonaphthalene-8-sulfonic acid, or 3-amino-6-methylbenzene sulfonic acid-(1)-(N-methylanilide-X-sulfonic acid), instead of 3-amino-4-methylbenzene sulfonic acid-(1)-(N-methylanilide-X-sulfonic acid).

*Example 6*

0.2 part of the dyestuff obtained as described in the first paragraph of Example 1 is dissolved in 400 parts of water, 1 part of crystalline sodium sulfate is added to the dyebath, and 10 parts of wool are entered at 40–50° C. 0.3 part of acetic acid are then added, the bath is slowly brought to a gentle boil in the course of ½ hour, and dyeing is carried on at that temperature for ¾ hour. After washing and drying the material, a fast deep blue dyeing is obtained.

What I claim is:
1. A disazo-dyestuff of the formula

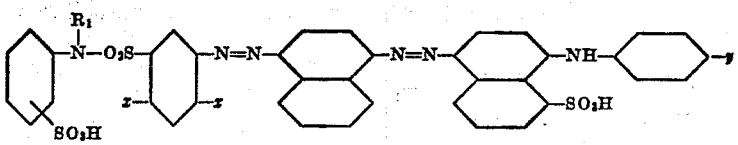

in which $R_1$ represents an alkyl radical containing at most two carbon atoms, one $x$ represents hydrogen and the other $x$ a member selected from the group consisting of hydrogen and methyl, and $y$ represents a member selected from the group consisting of hydrogen and methyl.

2. The disazo-dyestuff of the formula

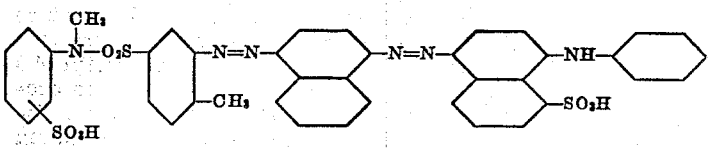

3. The disazo-dyestuff of the formula

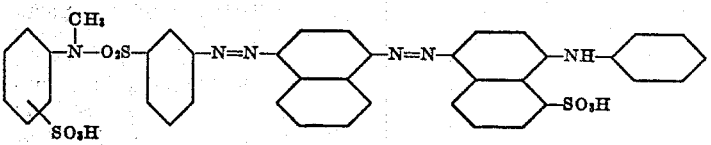

4. The disazo-dyestuff of the formula

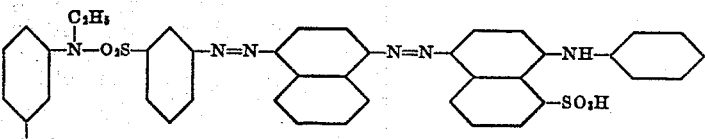

RUDOLF RUEGG.

REFERENCES CITED

The following references are of record in the file of this patent:

UNITED STATES PATENTS

| Number | Name | Date |
|---|---|---|
| 2,034,668 | Reindel et al. | Mar. 17, 1936 |
| 2,222,749 | Krebser | Nov. 26, 1940 |
| 2,257,694 | Krebser | Sept. 30, 1941 |
| 2,399,064 | Schetty | Apr. 23, 1946 |

FOREIGN PATENTS

| Number | Country | Date |
|---|---|---|
| 13,626 | Great Britain | 1895 |
| 408,590 | Great Britain | Mar. 29, 1934 |
| 546,595 | Great Britain | July 21, 1942 |